United States Patent
Wang et al.

(10) Patent No.: US 8,298,508 B2
(45) Date of Patent: *Oct. 30, 2012

(54) RECOVERY OF ALUMINA TRIHYDRATE DURING THE BAYER PROCESS USING CROSS-LINKED POLYSACCHARIDES

(75) Inventors: Jing Wang, Aurora, IL (US); Heinrich E Bode, Aurora, IL (US); Xiaojin Harry Li, Palatine, IL (US)

(73) Assignee: Nalco Company, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/852,910

(22) Filed: Aug. 9, 2010

(65) Prior Publication Data
US 2012/0034142 A1    Feb. 9, 2012

(51) Int. Cl.
*C01F 7/02* (2006.01)
*C01F 7/04* (2006.01)
(52) U.S. Cl. ......... 423/625; 423/121; 423/122; 423/127
(58) Field of Classification Search .................. 423/625, 423/630, 111, 121, 122, 127; 210/729–732
See application file for complete search history.

(56) References Cited

U.S. PATENT DOCUMENTS

| | | |
|---|---|---|
| 3,085,853 A | 4/1963 | Lesinski |
| 4,339,331 A | 7/1982 | Lim |
| 4,737,352 A | 4/1988 | Owen |
| 5,008,089 A | 4/1991 | Moody |
| 5,041,269 A | 8/1991 | Moody |
| 5,049,612 A | 9/1991 | Bulstovic |
| 5,091,159 A | 2/1992 | Connolly |
| 5,106,599 A | 4/1992 | Roe |
| 5,346,628 A | 9/1994 | Sommese |
| 5,478,477 A * | 12/1995 | Ramesh et al. ............... 210/728 |
| 5,716,530 A | 2/1998 | Strominger |
| 6,726,845 B1 | 4/2004 | Barham |
| 6,740,249 B1 | 5/2004 | Barham |
| 6,814,873 B2 | 11/2004 | Spitzer |
| 2007/0172405 A1 | 7/2007 | Liu |
| 2008/0257827 A1 * | 10/2008 | Dai et al. ..................... 210/729 |

FOREIGN PATENT DOCUMENTS

| | | |
|---|---|---|
| AU | 737191 | 8/2001 |
| AU | 737191 B2 | 8/2001 |

OTHER PUBLICATIONS

Patil, Sachin, "Crosslinking of Polysaccharides: Methods and Applications" 2008, vol. 6 Issue 2, Pertinent pp. 1, and 6-7.*
Kapuśniak, Janusz et al., "Starch Based Depressors for Selective Flotation of Metal Sulfide Ores," Starch, vol. 51, No. 11-12, 2000, pp. 416-421.
Termes, S. C. et al., "Insoluble crossslinked starch xanthate as a selective flocculant for sulfide minerals," Transactions of the American Institute of Mining, Metallurgical, and Petroleum Engineers, Society of Mining Engineers of AIME, vol. 274, 1983, pp. 1971-1977.

* cited by examiner

*Primary Examiner* — Stanley Silverman
*Assistant Examiner* — Justin Bova
(74) *Attorney, Agent, or Firm* — Benjamin E. Carlsen; Andrew D. Sorensen

(57) ABSTRACT

The invention provides methods and compositions for improving the production of alumina hydrate. The invention involves adding one or more polysaccharides to liquor or slurry in the fluid circuit of the production process. The one or more polysaccharides can be a cross-linked polysaccharide (such as cross-linked dextran or cross-linked dihydroxypropyl cellulose). The various polysaccharides can impart a number of advantages including at least some of: greater flocculation effectiveness, increasing the maximum effective dosage, faster settling rate. The production process can be a Bayer process.

11 Claims, No Drawings

RECOVERY OF ALUMINA TRIHYDRATE DURING THE BAYER PROCESS USING CROSS-LINKED POLYSACCHARIDES

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The invention relates to a method for improving the Bayer process for the production of alumina from bauxite ore. The invention concerns the use of cross-linked polysaccharides, specifically cross-linked dextran or cross-linked dihydroxypropyl cellulose to improve the performance of unit operations within the Bayer process, in particular to enhance the settling of fine alumina trihydrate crystals.

In the typical Bayer process for the production of alumina trihydrate, bauxite ore is pulverized, slurried with caustic solution, and then digested at elevated temperatures and pressures. The caustic solution dissolves oxides of aluminum, forming an aqueous sodium aluminate solution. The caustic-insoluble constituents of bauxite ore are then separated from the aqueous phase containing the dissolved sodium aluminate. Solid alumina trihydrate product is precipitated out of the solution and collected as product.

As described at least in part, among other places, in U.S. Pat. No. 6,814,873, the Bayer process is constantly evolving and the specific techniques employed in industry for the various steps of the process not only vary from plant to plant, but also are often held as trade secrets. As a more detailed, but not comprehensive, example of a Bayer process, the pulverized bauxite ore may be fed to a slurry mixer where an aqueous slurry is prepared. The slurry makeup solution is typically spent liquor (described below) and added caustic solution. This bauxite ore slurry is then passed through a digester or a series of digesters where the available alumina is released from the ore as caustic-soluble sodium aluminate. The digested slurry is then cooled, for instance to about 220° F., employing a series of flash tanks wherein heat and condensate are recovered. The aluminate liquor leaving the flashing operation contains insoluble solids, which solids consist of the insoluble residue that remains after, or are precipitated during, digestion. The coarser solid particles may be removed from the aluminate liquor with a "sand trap", cyclone or other means. The finer solid particles may be separated from the liquor first by settling and then by filtration, if necessary.

The clarified sodium aluminate liquor is then further cooled and seeded with alumina trihydrate crystals to induce precipitation of alumina in the form of alumina trihydrate, $Al(OH)_3$. The alumina trihydrate particles or crystals are then classified into various size fractions and separated from the caustic liquor. The remaining liquid phase, the spent liquor, is returned to the initial digestion step and employed as a digestant after reconstitution with caustic.

Within the overall process one of the key steps is that of precipitation of the alumina trihydrate from the clarified sodium aluminate liquor. After the insoluble solids are removed to give the clarified sodium aluminate liquor, also referred to as "green liquor", it is generally charged to a suitable precipitation tank, or series of precipitation tanks, and seeded with recirculated fine alumina trihydrate crystals. In the precipitation tank(s) it is cooled under agitation to induce the precipitation of alumina from solution as alumina trihydrate. The fine particle alumina trihydrate acts as seed crystals which provide nucleation sites and agglomerate together and grow as part of this precipitation process.

Alumina trihydrate crystal formation (the nucleation, agglomeration and growth of alumina trihydrate crystals), and the precipitation and collection thereof, are critical steps in the economic recovery of aluminum values by the Bayer process. Bayer process operators strive to optimize their crystal formation and precipitation methods so as to produce the greatest possible product yield from the Bayer process while producing crystals of a given particle size distribution. A relatively large particle size is beneficial to subsequent processing steps required to recover aluminum metal. Undersized alumina trihydrate crystals, or fines, generally are not used in the production of aluminum metal, but instead are recycled for use as fine particle alumina trihydrate crystal seed. As a consequence, the particle size of the precipitated trihydrate crystals determines whether the material is to be ultimately utilized as product (larger crystals) of as seed (smaller crystals). The classification and capture of the different sized trihydrate particles is therefore an important step in the Bayer process.

This separation or recovery of alumina trihydrate crystals as product in the Bayer process, or for use as precipitation seed, is generally achieved by settling, cyclones, filtration and/or a combination of these techniques. Coarse particles settle easily, but fine particles settle slowly. Typically, plants will use two or three steps of settling in order to classify the trihydrate particles into different size distributions corresponding to product and seed. In particular, in the final step of classification a settling vessel is often used to capture and settle the fine seed particles. Within the settling steps of the classification system, flocculants can be used to enhance particle capture and settling rate.

The overflow of the last classification stage is returned to the process as spent liquor. This spent liquor will go through heat exchangers and evaporation and eventually be used back in digestion. As a result, any trihydrate particles reporting to the overflow in this final settling stage will not be utilized within the process for either seed or product. Effectively such material is recirculated within the process, creating inefficiencies. Therefore, it is important to achieve the lowest possible concentration of solids in the overflow of the last stage of classification to maximize the efficiency of the process.

As described for example in U.S. Pat. No. 5,041,269, conventional technology employs the addition of synthetic water soluble polyacrylate flocculants and/or dextran flocculants to improve the settling characteristics of the alumina trihydrate particles in the classification process and reduce the amount of solids in the spent liquor. While various flocculants are often used in the trihydrate classification systems of Bayer plants, it is highly desirable to reduce as far as possible, the loss of solids with the spent liquor.

Thus there is clear need and utility for a method of improving the classification and flocculation of precipitated alumina trihydrate in the Bayer process. Such improvements would enhance the efficiency of the production of alumina from bauxite ore.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed towards a method for settling alumina trihydrate in the Bayer process. The process comprises adding to the system an effective amount of cross-linked dextran or cross-linked dihydroxypropyl cellulose. The cross-linking is the result of reacting the dextran/dihydroxypropyl cellulose or dextran/dihydroxypropyl cellulose-containing substance with a bifunctional cross-linking agent under appropriate reaction conditions. The use of such a cross-linked dextran or cross-linked dihydroxypropyl cellulose flocculants results in improved settling of alumina trihydrate when compared to the use of conventional flocculants employed in this process. At least one embodiment of the invention is directed towards a method for producing alumina comprising the addition of a composition containing one or more polysaccharides, one of which is cross-linked dextran or cross-linked dihydroxypropyl cellulose to liquor of a Bayer process fluid stream. The composition may be added to said liquor in a trihydrate classification circuit of said alumina production process. The composition may be added to said liquor at one or more locations in said process where solid-liquid separation occurs. The addition locations may facilitate inhibiting the rate of nucleation of one or more alumina trihydrate crystals in said process. The addition location may facilitate reducing the rate of scale formation in said process. The composition may improve the yield of alumina trihydrate sequestration.

DETAILED DESCRIPTION OF THE INVENTION

For purposes of this application the definition of these terms is as follows:

"Dextran" is an α-D-1,6 glucose-linked glucan with side chains 1-3 linked to the backbone units of the biopolymer.

"Dihydroxypropyl cellulose" is a cellulose derivative with the addition of 1,2-dihydroxypropyl ether group to the cellulose backbone.

"Liquor" or "Bayer liquor" is liquid medium that has run through a Bayer process in an industrial facility.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

In at least one embodiment, a process for extracting alumina trihydrate comprises the digestion of pretreated bauxite ore in an alkaline liquor to produce a slurry of red mud solids and aluminate in suspension in the alkaline liquor then decanting the red mud solids from the alkaline liquor suspension to produce the decanting liquor; the passing of said decanting liquor through security filtration to remove all solids, precipitation and production of a slurry containing alumina trihydrate solids which then are flocculated and settled with the addition of a cross-linked polysaccharide. Larger trihydrate particles are put through the calcination process to produce purified alumina while finer particles are re-used as seed for the precipitation process.

In at least one embodiment the preferred flocculant of the trihydrate solids in the process is a crosslinked polysaccharide and the preferred polysaccharides are dextran and dihydroxypropyl cellulose. The flocculant is added in the range of 0.1 to 100 ppm. The most preferred dose range for the flocculant is 0.3 to 20 ppm.

In at least one embodiment a cross-linked dextran or cross-linked dihydroxypropyl cellulose is produced by addition of dextran or dihydroxypropyl cellulose to an alkaline solution containing sodium hydroxide, potassium hydroxide, or other alkali metals or water soluble alkaline earth metal hydroxide, to provide a causticized polymer solution having a pH in the range of 11 to 14. The causticized polysaccharide is then reacted with an appropriate bifunctional cross-linking agent. Suitable cross-linking agents able to react with two or more hydroxyl groups include but are not limited to epichlorohydrin, dichloroglycerols, divinyl sulfone, bisepoxide, phosphorus oxychloride, trimetaphosphates, dicarboxylic acid anhydride, N,N'-methylenebisacrylamide; 2,4,6-trichloro-s-triazine and the like. The cross-linking with one of the above reagents results in the causticized polymer solution becoming a highly viscous solution or paste. When an optimum desired solution viscosity is reached, the reaction can be terminated via pH neutralization of the solution with an appropriate acidic solution examples of which are acetic acid, sulfuric acid, hydrochloric acid and the like.

As described at least in U.S. Pat. Nos. 6,726,845, 6,740,249, 3,085,853, 5,008,089, 5,041,269, 5,091,159, 5,106,599, 5,346,628 and 5,716,530 and Australian Patents 5310690 and 737191, dextran itself has previously been used in the Bayer Process.

However, by cross-linking the dextran or dihydroxypropyl cellulose chains (or for that matter, other suitable polysaccharides), superior and unexpected improvements are observed in the activity of cross-linked material when compared to conventional polysaccharides or the uncross-linked analog. Prior art uses of polysaccharides are impaired by the fact that increasing dosages of polysaccharides in Bayer liquor result in superior flocculation only up to a maximum dosage. After the maximum dosage has been reached, further addition of such polysaccharide material typically produces no further performance improvement. When the cross-linked polysaccharides are used and in particular when cross-linked dextran is used, superior performance (not possible at any dose rate using conventional polysaccharides) can be achieved. Surprisingly the maximum performance of cross-linked dextran is superior to the maximum performance using conventional dextran at any dose. Additionally, for cross-linked polysaccharides, the dose at which continued addition results in no further performance benefits is increased.

Furthermore, when the polysaccharide is cross-linked an unexpected 50% increase in effectiveness has been observed. For example, a composition comprising 5% cross-linked dextran will perform at least as well as a 10% composition of dextran, and in some cases better.

U.S. Pat. Nos. 5,049,612 and 4,339,331 teach that in mining applications such as sulfide ore flotation, it was found that the performance of starch, a traditional flotation depressant, can be improved after cross-linking. So while it is true that cross-linked polysaccharides have been used in mining applications such as in U.S. Pat. Nos. 5,049,612 and 4,339,331, it is quite unexpected that in Bayer process applications, the activity of dextran would be significantly improved after cross-linking. Furthermore, the ability of cross-linked polysaccharides to have up to or at least a 50% improvement in performance or to increase the maximum effective dosage of polysaccharides is unexpected and novel. In at least one embodiment the mass ratio of a general cross linking reagent/ polysaccharide can be varied between, but is not limited to, about 0 to 0.2. Specifically, for epichlorohydrin as the cross linking reagent, the ratio can be varied between, but is not limited to, 0 to 0.1, most preferably 0.005 to 0.08. Appropriate cross-linking is achieved as measured by an increase in the solution viscosity of at least 10% above the original solution viscosity.

In at least one embodiment the composition is added to liquor in a trihydrate classification circuit of said alumina trihydrate production process. The composition can be added to said liquor at one or more locations in a Bayer process where solid-liquid separation occurs.

In at least one embodiment the composition can be added to said liquor at one or more locations in a Bayer process where it inhibits the rate of nucleation of one or more alumina hydrate crystals in said process.

In at least one embodiment the composition can be added to said liquor at one or more locations in a Bayer process where it reduces the rate of scale formation in said process.

In at least one embodiment the composition can be added to said liquor at one or more locations in a Bayer process where it facilitates red mud clarification in the process.

In at least one embodiment the composition can be added in combination with or according to any of the compositions and methods disclosed in commonly owned and at least partially co-invented co-pending patent application having an attorney docket number of 7987 and a title of "THE RECOVERY OF ALUMINA TRIHYDRATE DURING THE BAYER PROCESS USING SCLEROGLUCAN."

EXAMPLES

The foregoing may be better understood by reference to the following examples, which are presented for purposes of illustration and are not intended to limit the scope of the invention.

Example 1

A series of cross-linked dextran products were produced using a conventional cross-linking process familiar to those skilled in the art where dextran (commercially available from Sigma-Aldrich) was added to a caustic solution and subsequently cross linked by reacting with epichlorohydrin. Within this method a variety of epichlorohydrin/dextran ratios varying from 0.030 to 0.055 were used to produce a range of materials with different levels of cross-linking, which were monitored through the increase of solution viscosity. These were denoted as products A-D. The performance of these cross-linked dextran products was compared to the performance of dextran in a series of settling tests using the following method.

A series of 200 mL samples of a Bayer process slurry were prepared each comprising 50 g/L aluminum trihydrate solids (DF225 aluminum trihydrate, commercially available from RJ Marshall Co, USA) and Bayer process liquor (with total caustic 233.6 g/l as $Na_2CO_3$). The Bayer process liquor samples were each equilibrated at 60° C. in 250 ml Nalgene bottles for 1 hour. Then the aluminum trihydrate solids were added to the bottles and mixed for 30 seconds. Dextran or its cross-linked analogs were then added as appropriate to individual bottles containing the hot slurry and the bottles were mixed for 1 minute and then left to settle for 3 minutes. The unsettled solids from each bottle, (and hence an indication of flocculation performance) was measured by filtering a 60 ml aliquot of slurry taken from the top of the liquor after the 3 minute settling period. Each sub-sample was filtered through a pre-weighed No. 934 AH filter paper and washed with hot deionized water. The filter paper and contents were then dried at 100° C. and reweighed. Solids content of the 60 mL sub-sample were then calculated in g/L. From the results listed in Table 1, it is evident that, compared to the use of dextran, the flocculation performance was significantly improved for all cross-linked dextran products. This was evident across the whole range of cross-linking ratios.

TABLE 1

Settling tests of standard aluminum trihydrate with addition of dextran and cross-linked dextrans

| Product | Dose (ppm) | Unsettled solids (g/L) |
| --- | --- | --- |
| Dextran | 2.1 | 18.40 |
| A | 2.0 | 14.18 |
| B | 2.0 | 13.93 |
| C | 1.4 | 10.75 |
| D | 2.0 | 9.93 |
| C | 2.0 | 9.77 |

Example 2

The same flocculation test method as that detailed in example 1 was used in this example. However, the performance of the products at two separate dose rates was assessed in this test. Additionally, another cross-linked dextran product (from a reaction where a epichlorohydrin/dextran ratio of 0.0575 was used) was also assessed across the two dose rates. This product was denoted as product E. Results of are listed in Table 2. With only one exception, all cross-linked analogs outperformed dextran at both dose rates (from 1 to 2 ppm).

TABLE 2

Settling tests of standard aluminum trihydrate with addition of dextran and cross-linked dextrans

| Product | Dose (ppm) | Unsettled solids (g/L) |
| --- | --- | --- |
| Dextran | 1 | 16.73 |
| A | 1 | 15.92 |
| B | 1 | 15.82 |
| D | 1 | 15.80 |
| C | 1 | 14.33 |
| E | 1 | 14.28 |
| Dextran | 2 | 10.58 |
| A | 2 | 11.13 |
| B | 2 | 10.25 |
| D | 2 | 9.48 |
| C | 2 | 7.98 |
| E | 2 | 8.20 |

Example 3

The same flocculation test method as that detailed in examples 1 and 2 was used in this example. However, a series of cross-linked dextran products, denoted G-J were used in addition to product E. In the manufacture of these products a fixed ratio of epichlorohydrin to dextran was used but the reaction time was varied in the range from 4 hours to 16 hours.

Results of are listed in Table 3. Those products with a shorter reaction time (denoted as products G, H and I), which have substantially less cross-linking of the dextran molecules, show no performance benefit versus dextran. However, those products where substantial cross-linking has taken place due to a longer reaction time (J and E), demonstrate superior flocculation performance versus dextran.

TABLE 3

Settling tests of standard aluminum trihydrate with addition of dextran and cross-linked dextran samples.

| Product | Dose (ppm) | Unsettled solids (g/L) |
|---|---|---|
| Dextran | 2 | 8.35 |
| G | 2 | 8.48 |
| H | 2 | 8.42 |
| I | 2 | 8.22 |
| J | 2 | 7.72 |
| E | 2 | 5.77 |

Example 4

In this example, a series of one litre samples of fresh Bayer plant Secondary Overflow slurry (containing about 140 g/L solids) were collected from an operating plant in individual one litre bottles. These were then stored in an oven at 75° C. After equilibration at temperature, the samples were transferred to individual one litre cylinders and conventional settling tests using a gang plunger were conducted on the slurry samples. Treatments using dextran and cross-linked dextran (product E) were compared at a variety of doses as detailed in Table 4. After mixing of the flocculant, the slurry was allowed to settle for 4 minutes before removal of a 60 ml sub-sample from the top of the cylinder. Samples from each treated slurry were filtered using a 0.45 micron glass microfibre filter paper, washed with hot deionized water and then dried. The mass of solids collected in the samples were then determined and recorded as an indication of flocculation performance. Table 4 shows the results of each treatment as the unsettled solids (reported in g/L). Again it is apparent that compared to dextran, the addition of cross-linked dextran can significantly reduce the amount of unsettled solids that would normally report to the overflow of the settling vessel. At all doses, the cross-linked product reduces the amount of unsettled solids. This example also surprisingly shows that, while increasing doses of dextran beyond 1.6 ppm results in no further reduction in solids, increasing doses of the cross-linked product (E) results in a reduced amount of solids across the whole dose range. This result surprisingly indicates that while the maximum benefit of the dextran is achieved within this dose range, further improvements in flocculation across this entire dose range are achieved using the cross-linked product.

TABLE 4

Settling tests of seed secondary overflow with addition of dextran and cross-linked dextran at different dosages

| Product | Dose (ppm) | Unsettled solids (g/L) |
|---|---|---|
| Dextran | 0.3 | 4.33 |
| E | 0.3 | 3.47 |
| Dextran | 0.5 | 3.50 |
| E | 0.5 | 2.24 |
| Dextran | 1 | 2.32 |
| E | 1 | 1.66 |
| Dextran | 1.6 | 1.92 |
| E | 1.6 | 1.40 |
| Dextran | 2 | 1.98 |
| E | 2 | 1.13 |

Example 5

Fresh Bayer plant Secondary Overflow slurry (containing approximately 67 g/L solids) was collected from an operating plant and placed into a series of one litre measuring cylinders. These were then equilibrated and stored in a waterbath at 65° C. A conventional settling test using a gang plunger was then conducted on the slurry samples. After mixing of the treatments, settling rates were determined by measuring the time taken for the solid/liquor interface to pass the 600 ml mark on each cylinder. Samples were allowed to settle for 4 minutes then a 50 ml sub-sample of slurry was taken from the top of each cylinder and the solids content determined as outlined in example 4. In this example, a cross-linked dextran (denoted as product Q) was used. It was produced from a reaction using an epichlorohydrin/dextran mass ratio of 0.02. Treatments using dextran and cross-linked dextran (product Q) were compared at a variety of doses as detailed in Table 5.

TABLE 5

Settling tests of seed secondary overflow with addition of dextran and cross-linked dextran at different dosages

| Product | Dose (ppm) | Settling rate (m/hr) | Unsettled solids (g/L) |
|---|---|---|---|
| Dextran | 2 | 4.5 | 0.96 |
| Q | 0.5 | 4.8 | 1.33 |
| Dextran | 4 | 5.3 | 0.77 |
| Q | 1 | 6.8 | 0.77 |

The data in table 5 indicates that even when cross-linked dextran was used at significantly lower dosages compared to dextran, superior settling rates and residual solids levels at or close to that observed with dextran treatment (at much higher dosage rates) were achieved.

Example 6

A similar method to that used in example 5 was also employed in this example. The slurry sample collected from the plant contained 67 g/L solids. In this example a series of products containing a mixture of dextran and cross-linked dextran were assessed. A product containing both dextran and cross-linked dextran together was formulated. The dextran/cross-linked dextran ratio of this product was approximately 10:1. The settling performance of this product (denoted Z) was assessed in a settling test and compared to the activity of dextran and cross-linked dextran (product Q) alone. Results are shown in Table 6.

TABLE 6

Settling tests of seed secondary overflow with addition of dextran, cross-linked dextran (Q) and dextran/cross-linked dextran combinations.

| Product | Dose (ppm) | Settling Rate (m/hr) | Unsettled Solids (g/L) |
|---|---|---|---|
| Dextran | 5.0 | 4.42 | 0.58 |
| Q | 0.5 | 4.86 | 1.17 |
| Z | 5.5 | 5.28 | 0.49 |

A combination of dextran and cross-linked dextran together (product Z) improves both settling rate and overflow solids content when compared to the individual components when used alone.

Example 7

A similar method to that used in examples 5 and 6 was also employed in this example. The solids content of the slurry used was 84 g/L. Dextran at various doses was compared to a cross-linked dextran (product Q) applied at much lower doses. Results are shown in Table 7.

TABLE 7

Settling tests and overflow solids of seed secondary overflow with addition of dextran or cross-linked dextran.

| Product | Dose (ppm) | Settling Rate (m/hr) | Unsettled Solids (g/L) |
|---|---|---|---|
| Dextran | 4 | 4.86 | 0.582 |
| Dextran | 3 | 4.42 | 0.815 |
| Dextran | 2 | 4.15 | 0.939 |
| Q | 1.40 | 6.23 | 0.706 |
| Q | 1.05 | 5.93 | 0.952 |
| Q | 0.70 | 5.65 | 1.155 |

Cross-linked dextran, when applied at low doses, shows faster settling rate and reduced overflow solids compared to dextran.

Example 8

A similar method to that used in examples 5, 6 and 7 was also employed in this example. The solids content of the slurry used was 67 g/L. Two products containing combinations of dextran and cross-linked dextran (denoted S and T) were compared to the use of cross-linked dextran (product Q). Results are shown in Table 8.

TABLE 8

Settling tests of seed secondary overflow with addition of dextran, cross-linked dextran (Q) and dextran/cross-linked dextran combinations.

| Product | Settling Rate (m/hr) | Unsettled Solids (g/L) |
|---|---|---|
| Q | 4.86 | 1.174 |
| S | 5.17 | 0.766 |
| T | 5.01 | 0.629 |

The addition of dextran to cross-linked dextran in products S and T improves performance in both settling rate and clarity.

Example 9

The same flocculation test method as that detailed in example 1 was used in this example. However, the products tested were dextran, dihydroxypropylcellulose (W) and its cross-linked analogs (X, Y). The results are listed in Table 9. From the results, it is evident that, compared to the use of dihydroxypropylcellulose, the flocculation performance was significantly improved after cross-linking. Furthermore, the cross-linked dihydroxypropyl cellulose outperformed dextran in to overflow solids reduction.

TABLE 9

Settling tests of standard aluminum trihydrate with addition of dihydroxypropyl cellulose (W) and cross-linked dihydroxypropyl cellulose (X, Y)

| Product | Dosage (ppm) | Unsettled Solids (g/L) |
|---|---|---|
| Dextran | 2 | 3.8 |
| W | 2 | 18.5 |
| X | 2 | 3.03 |
| Y | 2 | 2.05 |

While this invention may be embodied in many different forms, there are shown in the drawings and described in detail herein specific preferred embodiments of the invention. The present disclosure is an exemplification of the background and principles of the invention and is not intended to limit the invention to the particular embodiments illustrated. All patents, patent applications, scientific papers, and any other referenced materials mentioned anywhere herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of producing alumina utilizing a Bayer process, the method comprises the step of adding to a liquor or slurry of the Bayer process, a composition containing one or more cross-linked polysaccharides.

2. The method of claim 1 wherein the cross-linked polysaccharides, comprises a reaction product made by cross-linking dextran or dihydroxypropyl cellulose or polysaccharides with a cross linking agent to form a cross-linked molecule.

3. The method of claim 2 wherein the reaction product is one selected from the group consisting of: cross-linked scleroglucan, cross-linked pullulan, cross-linked zooglan, cross-linked lactan, cross-linked rhamsan, and any combination thereof.

4. The method of claim 1 further comprising the addition of an additional polymer to said process, the additional polymer is a synthetic polymer.

5. The method of claim 1 wherein the composition is added to said liquor at one or more locations in said process where solid-liquid separation occurs.

6. The method of claim 1 wherein the composition is added to said liquor at one or more locations and thereby inhibits the rate of nucleation of one or more alumina trihydrate crystals in said process.

7. The method of claim 1 wherein the composition is added to said liquor at one or more locations and thereby reduces the rate of scale formation in said process.

8. The method of claim 1 wherein the composition is added to said liquor at one or more locations to facilitate red mud clarification in said process.

9. The method of claim 1 wherein the composition addition improves the yield of alumina trihydrate sequestration from an alumina trihydrate process by adding the composition to said liquor of said process.

10. The method of claim 1 wherein the polysaccharide is cross linked with a crosslinking agent capable of reacting with at least two hydroxyl groups.

11. The method of claim 10 wherein the crosslinking agent is selected from the group consisting of: epichlorohydrin, dichloroglycerols, divinyl sulfone, bisepoxide, phosphorus oxychloride, trimetaphosphates, dicarboxylic acid anhydride, N,N'-methylenebisacrylamide; 2,4,6-trichloro-s-triazine, and any combination thereof.

* * * * *